United States Patent
Gendlin et al.

(10) Patent No.: US 9,478,810 B2
(45) Date of Patent: Oct. 25, 2016

(54) BATTERY HAVING A COOLING PLATE AND MOTOR VEHICLE HAVING A CORRESPONDING BATTERY

(75) Inventors: Boris Gendlin, Filderstadt (DE); Marc Dill, Stuttgart (DE); Ralf Angerbauer, Möglingen (DE); Conrad Bubeck, Esslingen (DE); Andreas Rueble, Stuttgart (DE)

(73) Assignees: Samsung SDI Co., Ltd., Yongin-si, Gyeonggi-do (KR); Robert Bosch GmbH, Stuttgart (DE)

(*) Notice: Subject to any disclaimer, the term of this patent is extended or adjusted under 35 U.S.C. 154(b) by 471 days.

(21) Appl. No.: 13/643,491

(22) PCT Filed: Feb. 28, 2011

(86) PCT No.: PCT/EP2011/052901
§ 371 (c)(1),
(2), (4) Date: Mar. 1, 2013

(87) PCT Pub. No.: WO2011/134699
PCT Pub. Date: Nov. 3, 2011

(65) Prior Publication Data
US 2013/0202940 A1 Aug. 8, 2013

(30) Foreign Application Priority Data
Apr. 26, 2010 (DE) .................. 10 2010 028 191

(51) Int. Cl.
| | |
|---|---|
| H01M 10/02 | (2006.01) |
| H01M 6/50 | (2006.01) |
| H01M 2/10 | (2006.01) |
| H01M 10/625 | (2014.01) |
| H01M 10/647 | (2014.01) |
| H01M 10/6556 | (2014.01) |
| H01M 10/6554 | (2014.01) |
| H01M 10/613 | (2014.01) |
| H01M 10/0525 | (2010.01) |

(52) U.S. Cl.
CPC ......... *H01M 6/5038* (2013.01); *H01M 2/1077* (2013.01); *H01M 2/1083* (2013.01); *H01M 10/613* (2015.04); *H01M 10/625* (2015.04); *H01M 10/647* (2015.04); *H01M 10/6554* (2015.04); *H01M 10/6556* (2015.04); *H01M 10/0525* (2013.01); *Y02T 10/7011* (2013.01)

(58) Field of Classification Search
CPC ...................................................... H01M 10/02
See application file for complete search history.

(56) References Cited

U.S. PATENT DOCUMENTS

| | | | | |
|---|---|---|---|---|
| 5,756,227 | A | * | 5/1998 | Suzuki et al. .................. 429/62 |
| 2008/0193830 | A1 | * | 8/2008 | Buck et al. .................... 429/120 |
| 2010/0104935 | A1 | * | 4/2010 | Hermann et al. ............. 429/120 |

FOREIGN PATENT DOCUMENTS

| | | |
|---|---|---|
| DE | 76 18 323 U1 | 10/1976 |
| DE | 10 2005 031 504 A1 | 1/2007 |
| DE | 10 2008 034 860 A1 | 1/2010 |
| EP | 1 278 263 A2 | 1/2003 |
| JP | 2001-313018 A | 11/2001 |
| WO | 2005/101939 A1 | 10/2005 |
| WO | 2009/103526 A1 | 8/2009 |

OTHER PUBLICATIONS

International Search Report corresponding to PCT Application No. PCT/EP2011/052901, mailed Aug. 12, 2011 (German and English language document) (9 pages).

* cited by examiner

Primary Examiner — Jacob Marks
(74) Attorney, Agent, or Firm — Maginot, Moore & Beck LLP

(57) ABSTRACT

A battery includes at least one battery module having a lower face, a cooling plate having an upper face, and a fixing system configured for the at least one battery module. The battery module is arranged on the upper face of the cooling plate. The fixing system includes at least two rails running at a distance from each other. The at least one battery module is fixed on the cooling plate by the rails in such a way that the lower face of the battery module is in direct contact with the upper face of the cooling plate. A motor vehicle includes the battery.

15 Claims, 1 Drawing Sheet

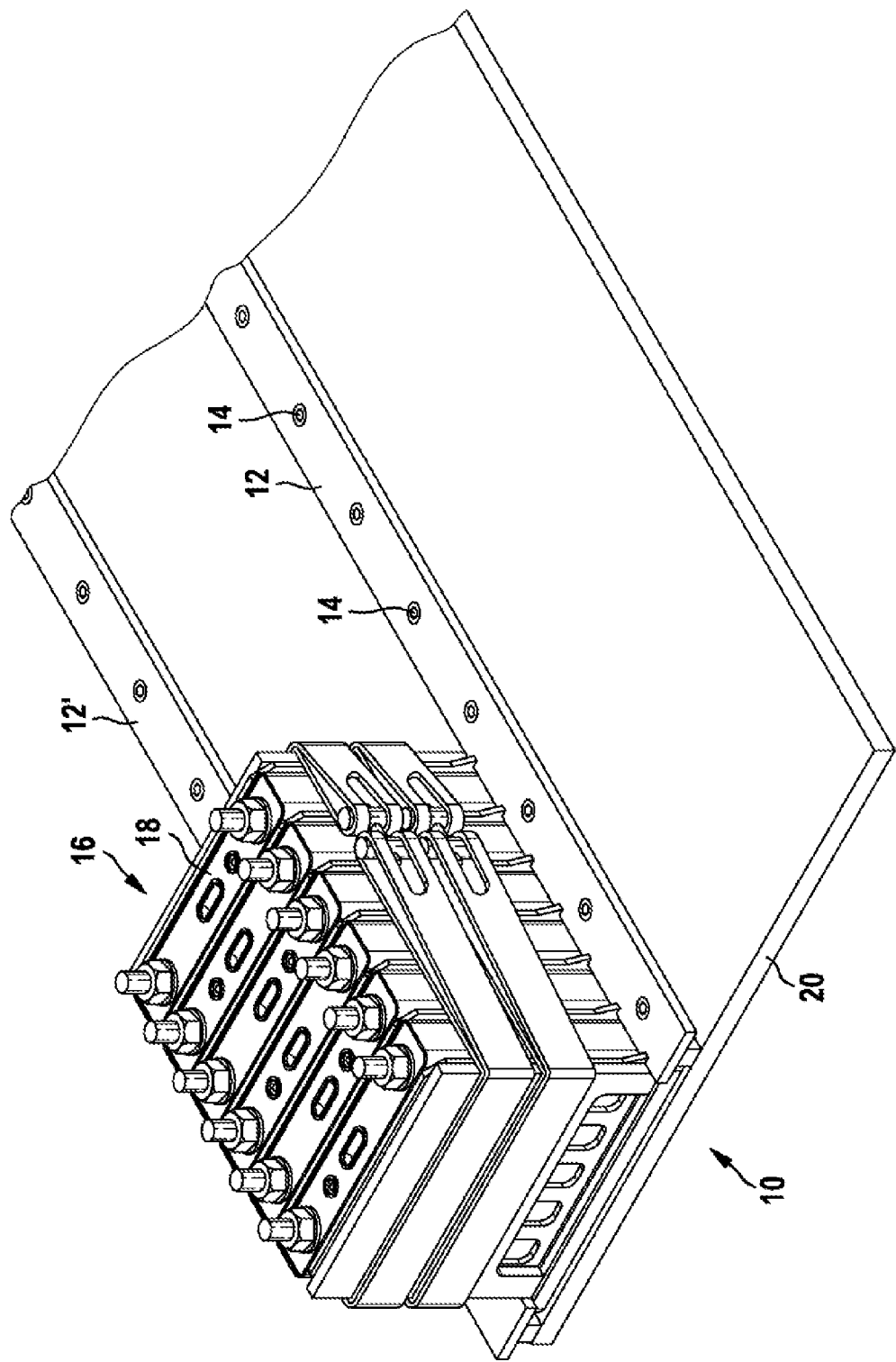

BATTERY HAVING A COOLING PLATE AND MOTOR VEHICLE HAVING A CORRESPONDING BATTERY

This application is a 35 U.S.C. §371 National Stage Application of PCT/EP2011/052901, filed on Feb. 28, 2011, which claims the benefit of priority to Serial No. DE 10 2010 028 191.3, filed on Apr. 26, 2010 in Germany, the disclosures of which are incorporated herein by reference in their entirety.

BACKGROUND

The disclosure relates to a battery having a cooling plate and to a motor vehicle having said battery, wherein the design of a fixing system allows particularly efficient mounting and cooling of the battery.

The practice of arranging battery modules with the lower side thereof on an upper side of a cooling plate is known. In this case, holes are arranged in the cooling plate, and the battery modules are connected to the cooling plate by means of screw fasteners. The disadvantage is that the screw fasteners must be installed from a lower side of the cooling plate, complicating an assembly process. Moreover, a defined contact pressure of the battery modules on the cooling plate is achievable only with a relatively large amount of effort by determining the torque of the screws as they are screwed in. The contact pressure should reach a defined magnitude to ensure that a thermal transfer resistance between the battery modules and the cooling plate is as low as possible.

Arrangements of accumulator battery housings on a support by means of rails are also known. Thus, DE 7618323 U discloses a device for retaining an accumulator battery consisting of a plurality of adjacently arranged housings on a support. For this purpose, a rail oriented perpendicularly to the center plane of the battery is fixed on the base of each accumulator battery housing in the region of the center thereof, said rail having a hook-type projection oriented parallel to the rail, which forms an interspace corresponding to the length and thickness of the projection between it and the rail. Identical rails having projections oriented in opposite directions relative to the rails fixed on the housings are fixed on the support, and the spacing between each pair of rails fixed on the support is dimensioned in such a way that the individual housings forming the accumulator battery support each other laterally.

SUMMARY

According to the disclosure, a battery is made available which comprises at least one battery module with a lower side, a cooling plate with an upper side, and a fixing system, arranged on the upper side of the cooling plate, for the at least one battery module, wherein the fixing system has at least two rails running at a distance from each other and, by means of the rails, the at least one battery module is fixed on the cooling plate in such a way that the lower side of the battery module is in direct contact with the upper side of the cooling plate. The battery is preferably a Li-ion battery.

This advantageously makes it possible to arrange battery modules on the cooling plate without the need for the lower side of the cooling plate to be accessible. During mounting of the battery according to the disclosure, there is no longer any need to turn the cooling plate and, as a result, the mounting process is simplified. By means of the rails, it is furthermore advantageously possible to slide the battery modules in and, as a result, the battery modules can assume the position envisaged for them in a guided manner. Complicated repositioning operations during mounting are therefore eliminated. Thus, the battery according to the disclosure can be mounted and serviced more easily and more quickly.

In a preferred embodiment of the disclosure, provision is made for the at least one battery module to be fixed on the cooling plate by means of the fixing system with a predefined contact pressure, preferably with a contact pressure of at least 3 bar, more preferably of at least 5 bar. By means of the defined contact pressure, a thermal transfer resistance which is as low as possible between the lower side of the battery module and the cooling plate is advantageously produced.

In another preferred embodiment of the disclosure, provision is made for the direct contact between the lower side of the battery module and the upper side of the cooling plate to be of heat-conducting design. This advantageously makes possible efficient dissipation of the heat of the battery module.

In another preferred embodiment of the disclosure, provision is made for the rails to have a T profile or an L profile. This makes it possible to use easily available prefabricated profiles for production, advantageously reducing the costs of materials.

In another preferred embodiment of the disclosure, provision is made for a tongue and groove system to be formed by means of the lower side of the battery module and the rails of the fixing system. This advantageously ensures accurate and rapid positioning of the battery module on the cooling plate. Moreover, the tongue and groove can likewise be connected to one another in a heat-conducting manner, thereby increasing the surface area that can be used for cooling and advantageously allowing a higher cooling capacity.

In another preferred embodiment of the disclosure, provision is made for the lower side of the battery module to have at least one projection, which is designed for engagement in the rails of the fixing system. The projection on the lower side of the battery module advantageously provides a particularly easy-to-implement and therefore low-cost way of connecting the battery module and the cooling plate.

In another preferred embodiment of the disclosure, provision is made for the whole of the lower side of the battery module to be in direct contact with the upper side of the cooling plate. The battery module is thereby connected to the cooling plate by the largest possible area of its lower side, thereby advantageously intensifying the cooling effect.

In another preferred embodiment of the disclosure, provision is made for the rails to have holes to receive screws, such that the rails can be fixed by means of screws from the upper side of the cooling plate. This advantageously makes possible firm and durable fixing of the rails by simple means and with a high additional contact pressure.

In another preferred embodiment of the disclosure, provision is made for the cooling plate to have coolant ducts. By means of the cooling ducts, it is advantageously possible for coolant to flow through the cooling plate and to achieve an increased cooling capacity.

Moreover, the disclosure also provides a motor vehicle having a battery in one of the abovementioned embodiments, wherein the battery is connected to a drive system of the motor vehicle. The advantages of the battery according to the disclosure as a component part are also of benefit to the motor vehicle as an assembly.

Advantageous developments of the disclosure are indicated in the dependent claims and explained in the description.

In this application, the term "battery" also includes battery systems, accumulator batteries, accumulators, accumulator systems, especially Li-ion systems or Li-polymer ion systems.

BRIEF DESCRIPTION OF THE DRAWING

The disclosure is explained in greater detail with reference to a drawing and to the following description. FIG. 1 shows a cooling plate according to the disclosure.

DETAILED DESCRIPTION

An example of a cooling plate 10 according to the disclosure is depicted in FIG. 1. Arranged on the upper side 20 thereof there are in this case two rails, one central rail 12 and one outer rail 12'. In the figure, a battery module 16 is positioned between the central rail 12 and the outer rail 12'. The battery module 16 is preferably formed from a plurality of battery cells 18 arranged in series.

The cooling plate 10 is used to control the temperature of the at least one battery module 16. For this purpose, the cooling plate 10 is preferably manufactured from metal, since metals have a high heat transfer coefficient. After being mounted, the battery module 16 is in direct contact with the cooling plate 10. The lower side of the battery module 16 is preferably in direct contact with the upper side 20 of the cooling plate 10. In this case, the lower side of the battery module 16, preferably the entire lower side of the battery module 16, is in heat-conducting contact with the upper side 20 of the cooling plate 10. There is no air gap representing a heat transfer resistance between the lower side of the battery module 16 and the upper side 20 of the cooling plate 10. It is also possible for the lower side of the battery module 16 or the upper side 20 of the cooling plate 10 to be formed by heat transfer compound in order to further reduce the heat transfer resistance.

According to the disclosure, it is also possible for the cooling plate 10 to have coolant ducts, through which a fluid coolant can flow and thus produce an additional cooling capacity.

The rails 12, 12' are arranged at a distance from each other on the upper side 20 of the cooling plate 10, preferably parallel to each other. According to the disclosure, the rails 12, 12' are made of plastic or metal or from plastic and metal. They can be embodied as T profiles or as L profiles, with the web of the profiles in each case being connected to the upper side 20. Designing the rails 12, 12' as T profiles or L profiles creates an undercut between the flange of the profiles and the upper side 20, in which undercut a corresponding protrusion on the lower side of the battery module 16 can engage. Here, the protrusion on the lower side of the battery module 16 corresponds to the undercut in such a way that a positive lock is produced in a direction perpendicular to the upper side 20 of the cooling plate 10, and the battery module 16 is positioned on the cooling plate 10 with a predetermined contact pressure. The protrusion is preferably formed as an overlap on the lower side of the battery module 16. For this purpose, the lower side of the battery module 16 can have a base plate which exceeds lateral dimensions of the remainder of the battery module and thus engages in a groove or recess of the rail. It is also possible for side parts of the battery module 16 to have a corresponding notch or recess in which the flanges of the profiles engage. In one embodiment, the lower side of the battery module 16 and the rails 12, 12' can also be designed as a tongue and groove system.

According to FIG. 1, T profiles are arranged. This offers the possibility of arranging battery modules 16 on both sides of a rail 12 or 12'.

In this case, the protrusion on the lower side of the battery module 16 is designed in such a way that the battery module 16 rests flat on the upper side 20 of the cooling plate 10 and by means of its lower side. For mounting, the at least one battery module 16 is inserted laterally between the rails 12, 12', in a longitudinal direction with respect to the rails 12, 12', or the rails 12, 12' are positioned after the battery module 16 has been arranged.

In FIG. 1, the rails 12, 12' have holes 14. The rails 12, 12' and the battery module 16 are fixed by means of screw fasteners through these holes 14 into the upper side 20 of the cooling plate 10. According to the disclosure, other joining options are also envisaged for fixing the rails 12, 12', e.g. riveting, punching, adhesive bonding or welding. Moreover, an embodiment of the cooling plate 10 according to the disclosure is provided in which the rails 12, 12' are formed on the upper side 20.

Once the battery module 16 has been arranged and the rails 12, 12' have been fixed, the rails 12, 12' exert a continuous force substantially perpendicular to and in a direction toward the upper side 20 on the protrusion on the lower side of the battery module 16 through elastic deformation. As a result, the battery module 16 is arranged on the cooling plate 10 with a defined contact pressure. The defined contact pressure ensures as low as possible a thermal transfer resistance between the battery module 16 and the cooling plate 10. According to the disclosure, it is at least 3 bar and more preferably 5 bar.

The invention claimed is:

1. A battery, comprising:
   at least one battery module with a lower side,
   a cooling plate with an upper side defining a cooling plane and located below and opposite to the lower side of the at least one battery module, and
   a fixing system arranged on the upper side of the cooling plate
   wherein the fixing system has at least two rails running at a distance from each other, the two rails each extending in a lengthwise direction in a plane parallel to the cooling plane, and the at least one battery module is fixed on the cooling plate by the rails in such a way that the lower side of the battery module is pressured by the rails and the upper side of the cooling plate.

2. The battery as claimed in claim 1, wherein the at least one battery module is fixed on the cooling plate by the fixing system with a predefined contact pressure.

3. The battery as claimed in claim 2, wherein the predefined contact pressure between the lower side of the at least one battery module and the upper side of the cooling plate is of heat-conducting design.

4. The battery as claimed in claim 1, wherein the rails have a T profile or an L profile with a portion of the rails contacting the upper side of the cooling plate.

5. The battery as claimed in claim 1, wherein a tongue and groove system is formed by the lower side of the at least one battery module and the rails of the fixing system.

6. The battery as claimed in claim 1, wherein the lower side of the at least one battery module has at least one laterally extending projection configured to engage at least one of the rails of the fixing system.

7. The battery as claimed in claim 1, wherein the whole of the lower side of the battery module is in direct contact with the upper side of the cooling plate.

8. The battery as claimed in claim 1, wherein the rails define holes to receive screws on the upper side thereof such that the rails are configured to be fixed by screws from the upper side of the cooling plate.

9. The battery as claimed in claim 1, wherein the cooling plate has coolant ducts.

10. The battery as claimed in claim 2, wherein the predefined contact pressure is at least 3 bar.

11. The battery as claimed in claim 2, wherein the predefined contact pressure is at least 5 bar.

12. The battery as claimed in claim 1, further comprising:

a heat transfer compound positioned between the upper side of the cooling plate and the lower side of the at least one battery module, the heat transfer compound in direct contact with both the upper side of the cooling plate and the lower side of the at least one battery module.

13. The battery as claimed in claim 8, wherein the upper side of the cooling plate is configured to receive the screws.

14. A motor vehicle, comprising:

a battery including:

at least one battery module with a lower side, a cooling plate with an upper side defining a cooling plane and located below and facing the lower side of at least one battery module, and a fixing system arranged on the upper side of the cooling plate, wherein the fixing system has at least two rails running a distance from each other, and at least one battery module is fixed on the cooling plate by the rails in such a way that the lower side of the battery module is pressured by the rails and the upper side of the cooling plate, wherein the battery is connected to a drive system of the motor vehicle.

15. The battery as claimed in claim 14, further comprising:

a heat transfer compound positioned between the upper side of the cooling plate and the lower side of the at least one battery module, the heat transfer compound in direct contact with both the upper side of the cooling plate and the lower side of the at least one battery module.

* * * * *

UNITED STATES PATENT AND TRADEMARK OFFICE
CERTIFICATE OF CORRECTION

PATENT NO. : 9,478,810 B2
APPLICATION NO. : 13/643491
DATED : October 25, 2016
INVENTOR(S) : Gendlin et al.

It is certified that error appears in the above-identified patent and that said Letters Patent is hereby corrected as shown below:

On the Title Page

In item (75), Inventor #5's last name should read:

Inventors: Boris Gendlin, Filderstadt (DE); Marc Dill, Stuttgart (DE); Ralf Angerbauer, Möglingen (DE); Conrad Bubeck, Esslingen (DE); Andreas Ruehle, Stuttgart (DE)

In the Claims

In Column 6, Lines 9-11 of Claim 14 should read:

wherein the fixing system has at least two rails running at a
distance from each other, and the at least one battery
module is fixed on the cooling plate by the rails in such Signed and Sealed this
Thirty-first Day of January, 2017

Michelle K. Lee
*Director of the United States Patent and Trademark Office*